(12) United States Patent
Thiel et al.

(10) Patent No.: US 8,805,940 B2
(45) Date of Patent: Aug. 12, 2014

(54) ENHANCED REPLICATION FOR MESSAGE SERVICES

(75) Inventors: Greg Thiel, Redmond, WA (US); David Sterling, Redmond, WA (US); Sabitha Abraham, Redmond, WA (US); Yogesh Bansal, Redmond, WA (US); Nikita Kozhekin, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 137 days.

(21) Appl. No.: 13/407,450

(22) Filed: Feb. 28, 2012

(65) Prior Publication Data

US 2013/0227028 A1 Aug. 29, 2013

(51) Int. Cl.
*G06F 15/16* (2006.01)
(52) U.S. Cl.
USPC .......................................................... 709/206
(58) Field of Classification Search
USPC .................................................. 709/206, 207
See application file for complete search history.

(56) References Cited

U.S. PATENT DOCUMENTS

| 7,370,064 B2 | 5/2008 | Yousefi'zadeh |
| 2003/0069953 A1 | 4/2003 | Bottom et al. |
| 2003/0217195 A1 | 11/2003 | Mandal et al. |
| 2007/0094312 A1* | 4/2007 | Sim-Tang ...................... 707/204 |
| 2008/0037565 A1* | 2/2008 | Murray et al. ................. 370/401 |
| 2010/0005259 A1* | 1/2010 | Prahlad et al. ................. 711/162 |
| 2010/0094999 A1 | 4/2010 | Rama et al. |
| 2011/0265085 A1 | 10/2011 | Kedem et al. |

OTHER PUBLICATIONS

Xtivia, Inc.; "Health Check for Sybase," 2008; 2 pages; Xtivia, Inc.; http://www.virtual-dba.com/pdfs/HC_Sybase_2008.pdf.
MSDN; "Monitoring Replication with Replication Monitor," 2011; 2 pages; Microsoft; http://msdn.microsoft.com/en-us/library/ms151780.aspx.

* cited by examiner

*Primary Examiner* — Larry Donaghue
*Assistant Examiner* — Marshall McLeod
(74) *Attorney, Agent, or Firm* — Louise Bowman; Jim Ross; Micky Minhas

(57) ABSTRACT

Systems, methods, and software are disclosed that provide enhanced replication for message services. In one implementation, updates to a message source are replicated to message targets. The replication is monitored to identify an individual health of the replication for each of the message targets. A composite health of the replication is determined based on the individual health of the replication for each of the message targets. The updates to the message source are then controlled based on the composite health of the replication.

19 Claims, 3 Drawing Sheets

ENHANCED REPLICATION FOR MESSAGE SERVICES

TECHNICAL FIELD

Aspects of the disclosure are related to computing and communications, and in particular to protecting data in message services with enhanced replication.

TECHNICAL BACKGROUND

Message services are increasingly depended upon by users to handle their vital communications, such as email, telephony, and video communications. Many different data protection solutions are employed to protect data in message environments, including data replication solutions. Data replication typically involves creating copies of source data and continuously updating the copies as modifications are made to the source data.

In an example involving email, an active email database is replicated to one or more passive email databases. At any given time the email service can failover from the active email database to any of the passive email databases, thereby ensuring that end users will be able to access their messaging content. As modifications are made to the active email database, the modifications are also replicated to the passive databases. For example, sending, receiving, or moving messages represent modifications that must be replicated.

At times, the rate at which modifications are made to source data, or even just the magnitude of a single modification, can overwhelm the ability of a replication process to adequately replicate the modifications to the corresponding copies of the source data. Other factors, such as the sub-optimal performance of systems or sub-systems involved in the replication, may also reduce the effectiveness of the replication process.

Various tools allow administrative personnel to manually observe the state of a replication process or the progress made in replicating modifications to source data. The personnel can then empirically decide whether or not to launch further modifications to the source data, such as moving files or folders within the source data.

Overview

Provided herein are systems, methods, and software that provide enhanced replication for message services. In one implementation, updates to a message source are replicated to message targets. The replication is monitored to identify an individual health of the replication for each of the message targets. A composite health of the replication is determined based on the individual health of the replication for each of the message targets. The updates to the message source are then controlled based on the composite health of the replication.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Implementations described herein provide for the enhanced replication of updates to a message source in a message service. In particular, the health of a replication process can be monitored and updates to a message source controlled based on the health of the replication process. In this manner, challenges presented by updates that may overwhelm the replication process can be mitigated or avoided.

In a brief example, an email service may implement enhanced replication to improve data protection across message databases. The message databases may include active and passive databases. As updates to an active database are implemented, the updates are replicated to the passive databases associated with the active database. The replication of the updates to the passive databases can be monitored and a composite health view of the replication formulated therefrom. Depending upon the composite health of the replication, the updates to the active database can be throttled, delayed, or otherwise controlled to allow the replication process to achieve an appropriate level of health.

Figure 1:
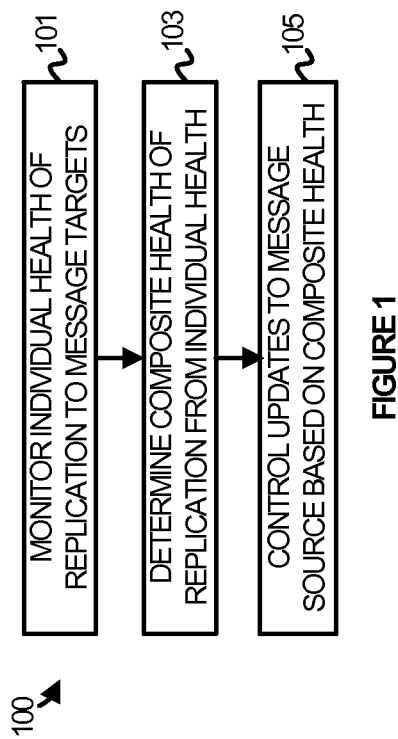
FIG. 1 illustrates an enhanced replication process in an implementation.

FIG. 1 illustrates enhanced replication process 100 in an implementation. Enhanced replication process 100 is representative of any process that may be employed to improve replication in a message service. Enhanced replication process 100 may be implemented as a part of or separate from the elements that provide the message service. For example, enhanced replication process 100 may be implemented on mailbox server, a protocol server, or a transport server, as well as on any other service element that may be involved in the provisioning and delivery of a message service. Enhanced replication process 100 may also be implemented in computer hardware or software, or any combination thereof, as will be discussed below in more detail with respect to FIG. 3.

Enhanced replication process 100 begins with monitoring the individual health of a replication of updates from a message source to several message targets (step 101). The updates occur as part of the normal operation of the message service and trigger the replication to the message targets. For example, message delivery operations may result in the addition of data to a message source. Likewise, message sending operations may result in the addition of data to a message source. Other operations initiated for administrative purposes, such as a move operation, may result in changes to the data within a message source.

As the message source is changed in view of the updates, the updates are replicated to the message targets. The replication may proceed differently with respect to each message target, and thus the state or progress of the replication with respect to each message target may differ. Monitoring the individual health of the replication for each message target can be accomplished in a number of ways, including querying the underlying computing systems that support each message target, or implementing reporting from each message target. The individual health of the replication can be identified using a numerical scale, a textual code, or any other suitable mechanism or convention for identifying a relative health of the replication for each message target.

Next, a composite health of the replication is determined based on the individual health of the replication with respect to each message target (step 103). The composite health may represent a view of the overall health of the replication and can be generated using a wide variety of analytical techniques. It should be understood that any number of rules or computational methods could be employed to arrive at a measure of the composite health of the replication process from the individual health of the message targets involved in the replication.

For example, the composite view may be an average of the individual health of each of the message targets. Alternatively, the composite view may be one of a range of numerical values that correspond to a level of data protection provided by the message targets overall.

Finally, updates to the message source are controlled based on the composite health of the replication (step 105). Assuming the composite health indicates that the state of the replication is healthy, it is possible that no changes are made to the rate at which updates are received and implemented in the message source. However, should the composite health correspond to an unhealthy state of the replication process, then the updates can be controlled to allow the replication to transition to an improved level of health. For instance, the updates can be delayed or throttled to provide time for past updates implemented in the message source to be replicated to the message targets.

Figure 2:
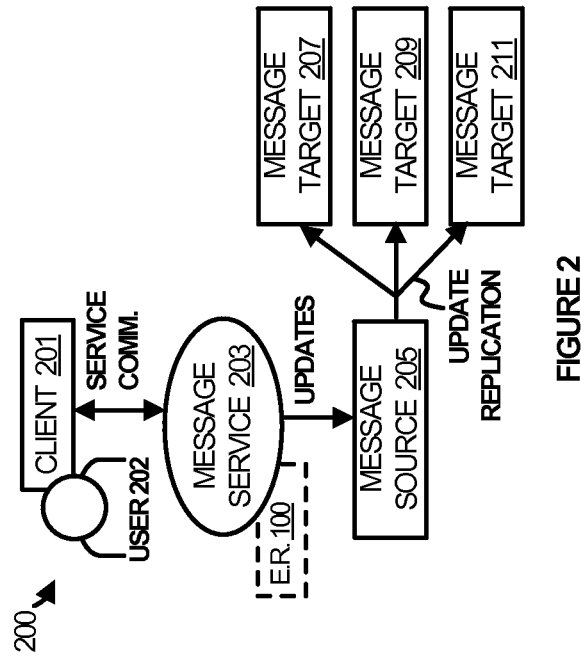
FIG. 2 illustrates an enhanced replication environment in an implementation.

Turning to FIG. 2, enhanced replication environment 200 is illustrated to demonstrate the application of enhanced replication process 100 in one implementation. Enhanced replication environment 200 includes client 201, message service 203, message source 205, and message targets 207, 209, and 211. In general, user 202 operates client 201 to obtain access to and use message service 203.

Examples of message service 203 include email, text messaging, and instant messaging services, as well as any other type of communication service with which user 202 may wish to engage. Message service 203 is implemented by various service systems and sub-systems (not shown) that provide various functional roles, such as transporting messages within and across domains, connecting message service 203 to other services, and providing client devices and applications with access to message stores, such as message source 205 and message targets 207, 209, and 211.

Examples of client 201 include email applications, text message application, instant messaging application, and unified communications applications, as well as any other type of application capable of providing an interface to message service 203. Client 201 may be implemented as a stand-alone application, but may also be integrated or running within other applications, such as a web browser. Client 201 may be implemented on a wide variety of computing devices, such as personal computers, laptop computers, desktop computers, tablet computers, mobile phones, personal digital assistants, televisions, and set-top boxes, as well as any other type of computing device or combination of devices capable providing client 201.

Message source 205 is representative of any data structure or repository that is capable of storing messages associated with user 202. It should be understood that message source 205 may store messages on behalf of users other than just user 202. For example, messages for an entire group or groups of users may be stored in message source 205. Message source 205 may be stored on storage media in a storage system, such as a server computer. Message targets 207, 209, and 211 are representative of any data structure or repository suitable for storing copies of message source 205. Message targets 207, 209, and 211 may also be stored on storage media in storage systems, such as server computers.

In operation, client 201 exchanges service communications with message service 203. Updates are provided to message source 205 corresponding to the actions and operations involved in the provisioning and delivery of message service 203 to user 202. Send, receive, and move are example operations that trigger updates to message source 205 and the data within message source 205 must change accordingly. Both sending and receiving operations may result in the addition of data to message source 205. Move operations may result in more complex or data intensive modifications to message source 205, such as the deletion of entire batches of messages, as well as the addition of entire batches of messages. It should be understood that updates to message source 205 may be necessary based on a wide variety of other operations that occur with respect to message service 203.

As updates to message source 205 are implemented, replication of the updates to message targets 207, 209, and 211 is initiated. The replication may be implemented using host-based or storage-based replication, as well as any combination or variation thereof. Other types of replication may also be implemented and are considered within the scope of this disclosure.

At times, the updates provided to message source 205 may occur so frequently or require such substantial changes to message source 205 that the health of the replication of the updates to message targets 207, 209, and 211 suffers. In other words, the replication of message source 205 to message targets 207, 209, and 211 may not be able to keep up with the changes to message source 205 driven by the updates. Other factors may also impact the health of the replication. For instance, the health of the underlying computing systems that implement the replication with respect to each message target 207, 209, and 211 may impact the health of the replication.

Accordingly, employing enhanced replication process 100 when providing message service 203 can serve to regulate the updates provided to message source 205. In particular, the individual health of the replication with respect to message targets 207, 209, and 211 is monitored. The individual health of the replication may be monitored by measuring the progress made against an update queue for each message target 207, 209, and 211. The progress may correspond to quantity of updates in the queue. Alternatively, the progress may correspond to an amount of time needed to process the updates in the queue. Message targets 207, 209 and 211 may report their individual health information, but may also be queried by message source or some other element within message service 203. Other mechanisms for measuring or otherwise determining the individual health of the replication are possible and should be considered within the scope of this disclosure.

Once the individual health of the replication for each message target 207, 209, and 211 is obtained, a composite health of the replication can be determined. The composite health provides an overall view of the replication of the updates to message source 205 and is used to control the updates to message source 205. As discussed above, the composite health can be determined using a wide variety of frameworks and can be communicated via any suitable convention for representing such information.

In one example, the individual health of the replication for each message target 207, 209, and 211 may be reported as a numerical value. The composite health could then be an average of the numerical values. Alternatively, the composite health could be a sum of the numerical values. In another example, the composite health of the replication may correspond to the highest measure of individual health reported by message targets 207, 209, and 211, or the average of the two highest measures of individual health reported by message targets 207, 209, and 211.

The composite health is then used to control the updates to message source 205, such as by throttling the processes that generate updates. Each system or process within message service 203 that initiates the updates may make its own determination how to control updates. Alternatively, control over updates may be provided by one centralized element capable of communicating control instructions to the other elements within message service 203 that may be the source of updates to message source 205. In yet another alternative, control over the updates may be provided in a hybrid manner whereby some elements self-determine how to control the updates, while other elements are controlled centrally.

Whether implemented in a centralized or distributed manner, controlling the updates may be accomplished in a number of ways, such as by pausing operations that trigger updates to message source 205 until the composite health of the replication of previous updates reaches a satisfactory level. This may involve delaying responses to requests that trigger updates for a certain amount of time. Alternatively, this may involve rejecting requests entirely. In another example, the operations may also be throttled such that the pace of updates to message source 205 is reduced, thereby allowing the health of the replication to improve. This may be accomplished by allocating a reduced number of threads to handle operations. The number of threads may then be increased once the health of the replication has improved. It should be understood that other mechanisms or techniques may be applied to control updates.

Alternatively, the updates may be allowed to proceed while the implementation of the updates in message source 205 can be paused or throttled. In other words, the processes that trigger the updates can proceed without limits, while the process of implementing the updates, such as by writing new data to message source 205, can be controlled. In this manner, the replication of recent updates will be delayed, providing time for the replication process to achieve an acceptable level of health with respect to previous updates.

Figure 3:
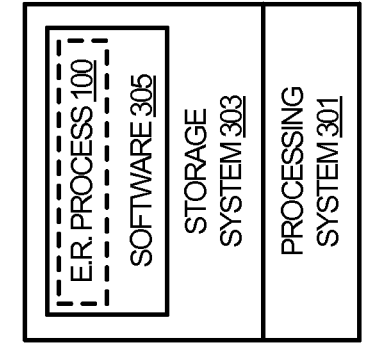
FIG. 3 illustrates a computer system for implementing an enhanced replication process in an implementation.

Referring now FIG. 3, computer system 300 and the associated discussion are intended to provide a brief, general description of a computing system suitable for implementing enhanced replication process 100. Many other configurations of computing devices and software computing systems may be employed to implement enhanced replication process 100.

Computer system 300 may be any type of computing system capable of determining the composite health of a replication and controlling updates accordingly, such as a server computer, client computer, internet appliance, or any combination or variation thereof. Indeed, computer system 300 may be implemented as a single computing system, but may also be implemented in a distributed manner across multiple computing systems. Computer system 300 is provided as an example of a general purpose computing system that, when implementing enhanced replication process 100, becomes a specialized system capable of supporting enhanced replication in message services.

Computer system 300 includes processing system 301, storage system 303, and software 305. Processing system 301 is communicatively coupled with storage system 303. Storage system 303 stores software 305 which, when executed by processing system 301, directs computer system 300 to operate as described for enhanced replication process 100.

Referring still to FIG. 3, processing system 301 may comprise a microprocessor and other circuitry that retrieves and executes software 305 from storage system 303. Software 305 includes enhanced replication process 100. Processing system 301 may be implemented within a single processing device but may also be distributed across multiple processing devices or sub-systems that cooperate in executing program instructions. Examples of processing system 301 include general purpose central processing units, application specific processors, and logic devices, as well as any other type of processing device.

Storage system 303 may comprise any storage media readable by processing system 301 and capable of storing software 305. Storage system 303 may include volatile and nonvolatile, removable and non-removable media implemented in any method or technology for storage of information, such as computer readable instructions, data structures, program modules, or other data. Storage system 303 may be implemented as a single storage device but may also be implemented across multiple storage devices or sub-systems. Storage system 303 may comprise additional elements, such as a controller, capable of communicating with processing system 301.

Examples of storage media include random access memory, read only memory, magnetic disks, optical disks, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software 305 comprises computer program instructions, such as monitoring instructions, composite health instructions, and update control instructions. Software 305 may also comprise firmware, or some other form of machine-readable processing instructions having enhanced replication process 100 embodied therein. Software 305 may be implemented as a single application but also as multiple applications. Software 305 may be a stand-alone application but may also be implemented within other applications distributed on multiple devices.

In general, software 305 may, when loaded into processing system 301 and executed, transform processing system 301, and computer system 300 overall, from a general-purpose computing system into a special-purpose computing system customized to determine the composite health of a replication and control updates based on the composite health as described for process 100 and its associated discussion.

Encoding software 305 may also transform the physical structure of storage system 303. The specific transformation of the physical structure may depend on various factors in different implementations of this description. Examples of such factors may include, but are not limited to: the technology used to implement the storage media of storage system 303, whether the computer-storage media are characterized as primary or secondary storage, and the like.

For example, if the computer-storage media are implemented as semiconductor-based memory, software 305 may transform the physical state of the semiconductor memory when the software is encoded therein. For example, software 305 may transform the state of transistors, capacitors, or other discrete circuit elements constituting the semiconductor memory.

A similar transformation may occur with respect to magnetic or optical media. Other transformations of physical media are possible without departing from the scope of the present description, with the foregoing examples provided only to facilitate this discussion.

Referring again to FIGS. 1-3, through the operation of computer system 300 employing software 305, transformations may be performed in message service 203. As an example, message service 203, or the system or sub-systems that provide message service 203, could be considered transformed from one state to another by controlling updates generated therein for provisioning in message source 205, initiated by software 305 employing process 100.

Computer system 300 may have additional devices, features, or functionality. Computer system 300 may optionally have input devices such as a keyboard, a mouse, a voice input device, or a touch input device, and comparable input devices. Output devices such as a display, speakers, printer, and other types of output devices may also be included. Computer system 300 may also contain communication connections and devices that allow computer system 300 to communicate with other devices, such as over a wired or wireless network in a distributed computing and communication environment. These devices are well known in the art and need not be discussed at length here.

Figure 4:
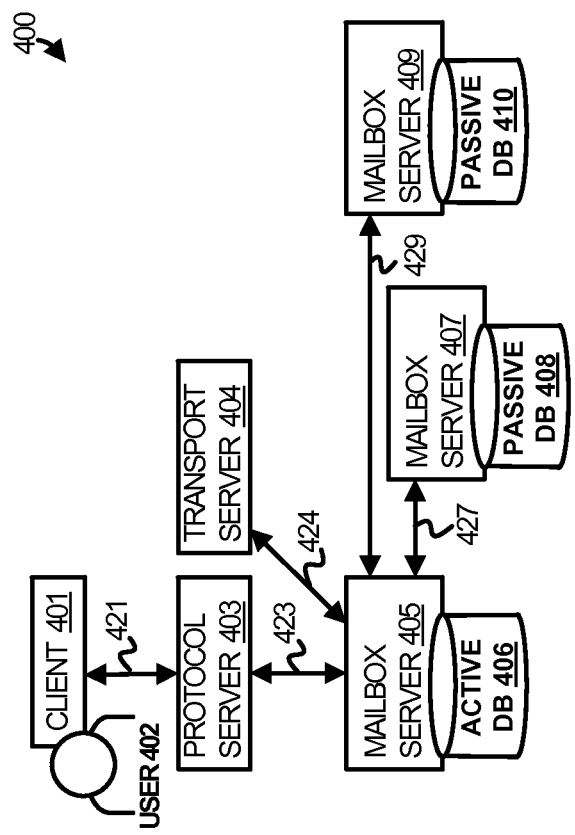
FIG. 4 illustrates an enhanced replication environment in an implementation.

Turning now to FIGS. 4-7, an enhanced replication environment is provided, as well as several operational sequences pertaining to the enhanced replication environment. FIG. 4 illustrates enhanced replication environment 400 in one implementation whereby an email service is provisioned and delivered to user 402, such as Microsoft® Exchange. Enhanced replication environment 400 includes client 401, protocol server 403, and transport server 404. Enhanced replication environment 400 also includes mailbox servers 405, 407, and 409, which host active database 406, passive database 408, and passive database 410 respectively.

Client 401 is representative of any email application capable of providing user 402 with an interface to a message service implemented in enhanced replication environment 400. Client 401 may be implemented as a stand-alone application, but may run within other applications, such as a web browser. Client 401 may be implemented on any type of computing device capable of running an email client application, such as a personal computer, a laptop or table computer, or a mobile phone, as well as any other type of device or computing appliance. Examples of client 401 include Microsoft® Outlook® and Outlook Web Application® (OWA).

Client 401 communicates with protocol server 403 over communication link 421 using any of a variety of messaging protocols, such as Post Office Protocol (POP), Internet Message Access Protocol (IMAP), Outlook Web App (OWA), Exchange Control Panel (ECP), or ActiveSync, to provide user 402 with access to messages and messaging functionality. Communication link 421 may be any link or collection of links capable of carrying or otherwise facilitating communication between client 401 and protocol server 403, including physical links, logical links, or any combination or variation thereof.

Protocol server 403 accepts connections from email clients, such as client 401, to provide users with access to their messages. In particular, protocol server 403 facilitates communication between client 401 and mailbox server 405, allowing user 402 to interface with their messages stored in active database 406. Protocol server 403 handles messaging tasks initiated by client 401, such as sending and receiving email and responding to move requests to move messages between folders associated with user 402.

Protocol server 403 is in communication with mailbox server 405 over communication link 423. Communication link 423 may be any link or collection of links capable of carrying or otherwise facilitating communication between protocol server 403 and mailbox server 405, including physical links, logical links, or any combination or variation thereof. Protocol server 403 communicates with mailbox server 405 to implement messaging functions requested by client 401, such as sending and receiving email messages. As messages are sent or received, the appropriate folders associated with user 402 are populated with the relevant message data.

Mailbox server 405 provides basic mailbox hosting and storage functionality. As mentioned, mailbox server 405 interacts with protocol server 403 to provide some aspects of the email service. However, mailbox server 405 also interacts with transport server 404 over communication link 424. Communication link 424 may be any link or collection of links capable of carrying or otherwise facilitating communication between transport server 404 and mailbox server 405, including physical links, logical links, or any combination or variation thereof.

Transport server 404 handles email routing, which may include routing messages within and outside of message domains. For example, messages placed in an outbox hosted by mailbox server 405 are retrieved by transport server 404 for delivery to the appropriate recipient. Similarly, incoming messages received by transport server 404 are delivered to the appropriate inbox hosted by mailbox server 405.

It should be understood that protocol server 403, transport server 404, and mailbox server 405 may be software servers, but when implemented on a computer system, such as computer system 300, may be considered server machines. Each may be implemented on its own server machine. However, protocol server 403, transport server 404, and mailbox server 405 may also be implemented together on a single server machine. Other combinations of software servers and machines are possible.

Mailbox server 405 is representative of mailbox servers 407 and 409. Mailbox servers 407 and 409 may also be associated with and interact with protocol server 403 and transport server 404. However, mailbox servers 407 and 409 may be associated with and interact with different protocol servers and transport servers not shown here for purposes of clarity. It should be understood that mailbox servers 405, 407, and 409 may each host other databases in addition to those illustrated in FIG. 4. For instance, mailbox server 405 may host other active database or passive database in addition to active database 406.

In operation, as protocol server 403 and transport server 404 interact with mailbox server 405 to provide the email service to client 401, updates to the message data in active database 406 associated with user 402 are implemented. For example, a send operation initiated by client 401 triggers protocol server 403 to communicate the subject email to mailbox server 405. Mailbox server 405 places the subject email in the appropriate outbox associated with client 401, which is monitored by transport server 404. Transport server 404 retrieves the email and transfers it for delivery to the appropriate destination.

In the foregoing example, several updates to active database 406 may occur. It should be understood that the following discussion is provided for illustrative purposes and that other replication techniques or processes are possible. First, upon client 401 directing that the outgoing email be sent, a copy of the email is deposited in the outbox associated with user 402. The outgoing email may be written to active database 406, at which time the placement of the email in the outbox is replicated to the corresponding copies of the outbox in passive database 408 and 410. In this manner, should mailbox server 405 or some other element fail rendering active database 406 unavailable, either of passive database 408 or 410 could take over as the active database. Under such circumstances, the subject email could still be in the outbox associated with user 402 subject to a send operation by a transport server.

Secondly, upon transport server 404 successfully sending the email, mailbox server 405 may move a copy of the email to a sent items folder associated with user 402. This update to the sent items folder is written to active database 406, at which time a replication of the email in the sent items folder is communicated to mailbox servers 407 and 409 for implementation in passive databases 408 and 410.

Similarly, a receive operation also triggers updates to active database 406 that are replicated to passive databases 408 and 410. The incoming email delivered by transport server 404 is deposited in the appropriate inbox folder associated with user 402. The incoming email is communicated to client 401 by way of protocol server 403. In addition, the incoming email is written to active database 406, again triggering a replication of the incoming email to passive databases 408 and 410.

In yet another example, a move operation may be initiated that triggers updates to active database 406. The move operation may be initiated by client 401, such as moving messages between folders associated with user 402. However, the move operation may be initiated by an administrative client (not shown), such as when all message data for a particular user of group of users is moved to a different message database. In either case, the move operation would require updates to active database 406 to reflect the data change. These changes would then be replicated to passive databases 408 and 410.

As should be understood from the examples provided above, many operations performed by protocol server 403, transport server 404, and mailbox server 405 to provide the email service to client 401 result in updates to active database 406. It should be understood that active database 406 may contain message data associated with many other users in addition to user 402. Thus, in the aggregate the pace of or magnitude of updates to active database may overwhelm traditional replication processes.

Instead, enhanced replication may be employed to maintain the effectiveness of replication to passive databases 408 and 410. As send, receive, and move operations are performed, updates are written to active database 406 as described above. However, the updates can be controlled based on the replication health of passive databases 408 and 410.

In particular, mailbox servers 407 and 409 may communicate health information to mailbox server 405 indicative of the health of a replication process with respect to passive databases 408 and 410 respectively. Mailbox server 405 determines a composite health of the replication based on the individual health of the replication in each of passive databases 408 and 410. Other elements may determine the composite health of the replication, including protocol server 403 and transport server 404, as will be discussed in more detail below with respect to FIG. 6 and FIG. 7. The composite health of the replication it used to pause, throttle, or otherwise control updates triggered by the provisioning and delivery of the email service to client 401.

For example, send operations initiated by clients, including client 401, by way of protocol server 403 may be delayed or throttled to accommodate the replication of previous updates to active database 406. Likewise, the delivery of incoming email messages by transport server 404 to mailbox server 405 may also be delayed or throttled. Move operations initiated by end users or administrative personnel can be delayed or throttled. Indeed, any type of operation that may result in updates to active database 406 can be controlled so as to maintain or even improve the replication health of passive databases 408 and 410.

Figure 5:
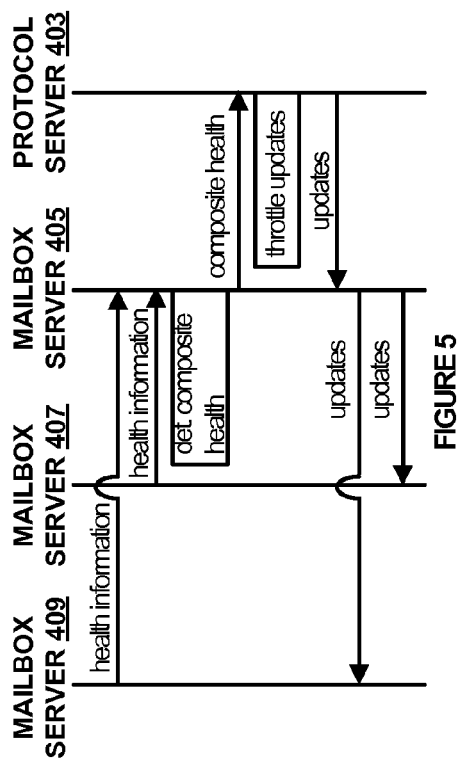
FIG. 5 illustrates an operational sequence in an implementation.
Figure 6:
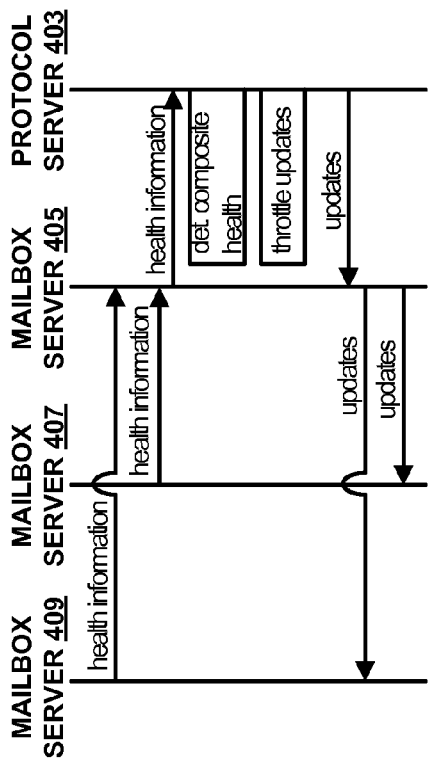
FIG. 6 illustrates an operational sequence in an implementation.
Figure 7:
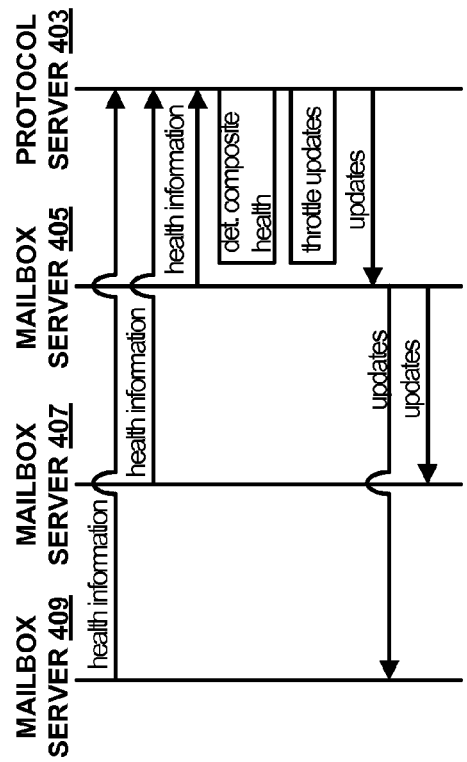
FIG. 7 illustrates an operational sequence in an implementation.

Turning now to FIGS. 5-7, illustrated are several operational sequences that describe various operational scenarios in enhanced replication environment 400. In particular, FIG. 5 illustrates one example sequence whereby mailbox server 405 determines the composite health of a replication, and then provides the composite health to protocol server 403 to control updates to active database 406. In contrast, FIG. 6 illustrates a sequence whereby protocol server 403 determines the composite health. Finally, FIG. 7 illustrates a similar scenario as that provided in FIG. 6, except that health information is provided directly to protocol server 403, rather than by way of mailbox server 405.

Each of FIGS. 5-7 involve protocol server 403 for exemplary purposes. However, it should be understood that transport server 404 could be substituted in place of or provided in addition to protocol server 403 in each operational sequence.

Referring now to FIG. 5, illustrated is an operational sequence whereby the composite health of the replication of updates to active database 406 is determined by mailbox server 405. In this illustration, mailbox server 409 provides health information to mailbox server 405 that indicates the health of the replication of the updates with respect to passive database 410. For instance, mailbox server may report replication statistics or other measurable characteristics pertaining to the state or progress of replicating active database 406 to passive database 410. Examples of health information include a quantity of updates remaining to be implemented in passive database 410 or an amount of time required to implement any remaining updates, as well as other implementation characteristics. Alternatively, a suitable convention or standard may be used to represent the health of the replication of active database 406 to passive database 410, such a numeric or alphabetical convention. Regardless of style or convention, the health information is provided to mailbox server 405 for consideration when determining the overall health of the replication.

Mailbox server 407 also provides health information to mailbox server 405 indicative of the health of the replication with respect to passive database 408. As with mailbox server 409, mailbox server 409 may represent the health of the replication in a variety of ways, including performance characteristics or alpha-numeric values or symbols corresponding to a shared convention for reporting health information.

Mailbox server 405 receives the health information from mailbox servers 407 and 409 accordingly, and processes the health information to arrive at the composite health of the replication of active database 406 to passive databases 408 and 410. The composite health may also be represented in a variety of ways, such as aggregate performance information or characteristics. In an example, the composite health may be represented by a total number of updates remaining in queue to be implemented in passive databases 408 and 410. Alternatively, the composite health may be represented by a numeric or alphabetical convention. Many different computational algorithms could be employed to arrive at a suitable indicative of the composite health of the replication.

Having determined the composite health, mailbox server 405 provides the composite health to protocol server 403 in order to control updates to active database 406. It should be understood that mailbox server 405 could provide the composite health to other systems or process from which updates may originate, such as transport server 404. Protocol server 403 determines an appropriate adjustment to make to the updates based on the composite health. For example, a composite health indicative of an impaired replication process may cause protocol server 403 to pause any operations indefinitely that may generates updates until an improvement in the composite health could be realized. In another option, protocol server 403 may determine to throttle updates such that the replication process can recover and continue at an appropriate level of health.

It should be understood that, optionally, mailbox server 405 may itself determine the appropriate remedy for protocol server 403 to implement based on the composite health of the replication. In such an example, mailbox server 405 would determine that delays, throttling, or some other adjustment to the updates initiated by protocol server 403 are needed and would communicate an instruction to protocol server 403 indicating as much.

In this example, protocol server 403 proceeds to implement throttling. Protocol server 403 continues to communicate updates to mailbox server 405, but at a pace that presumably allows the composite health of the replication to recover. Mailbox server 403 receives and implements the updates in active database 406, which triggers their replication to passive databases 408 and 410.

In FIG. 6, the composite health of the replication of updates to active database 406 is determined by protocol server 403, rather than mailbox server 405. In this illustration, mailbox server 409 provides health information to mailbox server 405 that indicates the health of the replication of the updates with respect to passive database 410. Similarly, mailbox server 407 provides health information to mailbox server 405 indicative of the health of the replication with respect to passive database 408.

As discussed above with respect to FIG. 5, the health information may include performance information or characteristics describing the progress of the replication with respect to passive databases 408 and 410. Alternatively, the health information may be an alpha-numeric value or character corresponding to the individual health of the replication for each database in accordance with a reporting convention or standard.

Rather than determine the composite health of the replication, mailbox server 405 provides the health information to protocol server 403. Protocol server 403 processes the aggregate health information to determine the composite health of the replication to passive databases 408 and 410. Then, based on the composite health of the replication, protocol server 403 determines an appropriate response to maintain or improve the health of the replication. In this example it is determined that update throttling is necessary. Accordingly, protocol server 403 throttles the updates to mailbox server 405. As the updates are received and implemented in mailbox server 405, the updates are replicated to mailbox servers 407 and 409 for implementation in passive databases 408 and 410 respectively.

FIG. 7 illustrates another alternative operational sequence whereby the composite health of the replication of updates to active database 406 is determined by protocol server 403. However, in this implementation, health information is provided by mailbox server 409 directly to protocol server 403, bypassing mailbox server 405. Likewise, health information is provided by mailbox server 407 directly to protocol server 403, bypassing mailbox server 405. Optionally, mailbox server 405 may also provide health information to protocol server 403.

As discussed above with respect to FIG. 5, the health information may include performance information or characteristics describing the progress of the replication with respect to passive databases 408 and 410. Alternatively, the health information may be an alpha-numeric value or character corresponding to the individual health of the replication for each database in accordance with a reporting convention or standard.

Protocol server 403 then processes the health information to determine the composite health of the replication. Based on the composite health of the replication, protocol server 403 determines an appropriate response to maintain or improve the health of the replication. In this example it is determined that update throttling is necessary. Accordingly, protocol server 403 throttles the updates to mailbox server 405. As the updates are received and implemented in mailbox server 405, the updates are replicated to mailbox servers 407 and 409 for implementation in passive databases 408 and 410 respectively.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of providing enhanced replication to facilitate data protection in a message service, the method comprising:
monitoring a replication from a message source to a plurality of message targets of updates implemented in the message source to identify an individual health of the replication for each of the plurality of message targets;
determining a composite health of the replication based on the individual health of the replication for each of the plurality of message targets; and
controlling the updates to the message source based on the composite health of the replication, including at least one of throttling the updates and delaying the updates.

2. The method of claim 1 further comprising transferring health information from a plurality of mailbox servers that host the plurality of message targets to a mailbox server that hosts the message source, wherein the health information comprises the individual health of the replication for each of the plurality of mailbox servers that host the plurality of message targets.

3. The method of claim 2 further comprising transferring the health information from the mailbox server that hosts the message source to a protocol server that initiates the updates, wherein determining the composite health of the replication occurs in the protocol server.

4. The method of claim 2 further comprising transferring the composite health of the replication from the mailbox server that hosts the message source to a protocol server.

5. The method of claim 2 wherein controlling the updates to the message source comprises communicating an instruction from the mailbox server that hosts the message source to a protocol server that initiates the updates to delay the updates to the message source.

6. The method of claim 2 further comprising transferring the composite health of the replication from the mailbox server that hosts the message source to a transport server that initiates the updates.

7. The method of claim 2 wherein controlling the updates to the message source comprises communicating an instruction from the mailbox server that hosts the message source to a transport server that initiates the updates to delay the updates to the message source.

8. The method of claim 1 wherein the message service comprises an email service, wherein the message source comprises an active database, and wherein the plurality of message targets comprises a plurality of passive databases.

9. A method of operating a message system comprising a protocol server and a mailbox server to facilitate data protection in a message service, the method comprising:
in the mailbox server: hosting an active database, receiving progress information for each of a plurality of passive databases that identifies at least a progress of a replication of the active database with respect to each of the plurality of passive databases, processing the progress information to generate composite information corresponding to a composite progress of the replication of the active database to the plurality of passive databases, and
communicating the composite information to the protocol server to control updates to the active database; and
in the protocol server: throttling the updates to the active database based on the composite information.

10. The method of claim 9 wherein the message system further comprises a transport server, and wherein the method further comprises:
in the mailbox server, communicating the composite information to the transport server to control other updates to the active database; and
in the transport server, throttling the other updates to the active database based on the composite information.

11. The method of claim 9 wherein the message service comprises an email service.

12. The method of claim 9 wherein throttling the updates to the active database comprises, in the protocol server, delaying at least a portion of a move operation directed to move at least a portion of the active database to a different database.

13. A device having stored thereon computer-useable program instructions for providing enhanced replication to facilitate data protection in a message service, wherein the program instructions comprise:
monitoring instructions that, when executed by a computer system, direct the computer system to monitor a replication from a message source to a plurality of message targets of updates implemented in the message source to identify an individual health of the replication for each of the plurality of message targets;
composite health instructions that, when executed by the computer system, direct the computer system to determine a composite health of the replication based on the individual health of the replication for each of the plurality of message targets; and
update control instructions that, when executed by the computer system, direct the computer system to control the updates to the message source based on the composite health of the replication by at least throttling the updates or delaying the updates.

14. The device of claim 13 wherein the message source comprises an active database, wherein a mailbox server hosts the active database, and wherein the plurality of message targets comprises a plurality of passive databases, wherein a plurality of mailbox servers host the plurality of passive databases.

15. The device of claim 14 wherein to monitor the replication, the monitoring instructions direct the computer system to monitor health information communicated from the plurality of mailbox servers that host the plurality of passive databases to the mailbox server that hosts the active database, wherein the health information identifies the individual health of the replication for each of the plurality of mailbox servers that host the plurality of passive databases.

16. The device of claim 15 wherein the computer system comprises the mailbox server that hosts the active database, and wherein:
to determine the composite health of the replication, the determining instructions, when executed by the mailbox server, direct the mailbox server to process the health information to determine the composite health of the replication.

17. The device of claim 16 wherein to control the updates to the message source, the update control instructions, when executed by the mailbox server, direct the mailbox server to communicate the composite health of the replication to a protocol server that initiates the updates, in response to which the protocol server throttles the updates based on the composite health.

18. The device of claim 16 wherein to control the updates to the message source, the update control instructions, when executed by the mailbox server, direct the mailbox server to communicate the composite health of the replication to a transport server that initiates the updates.

19. The device of claim 13 wherein the message service comprises an email service.

* * * * *